United States Patent [19]

Sachsse

[11] 4,152,699

[45] May 1, 1979

[54] OPTICAL KEYBOARD HAVING A PLURALITY OF PIVOTAL LIGHT OBSTRUCTING CODE BARS

[76] Inventor: Lothar Sachsse, 24 Raabstrasse, Nuremberg 85, Fed. Rep. of Germany

[21] Appl. No.: 777,540

[22] Filed: Mar. 14, 1977

[30] Foreign Application Priority Data

Mar. 23, 1976 [DE] Fed. Rep. of Germany ....... 2612162

[51] Int. Cl.$^2$ ............................................... G06F 3/02

[52] U.S. Cl. ............................ 340/365 P; 178/17 D; 250/221

[58] Field of Search ........................ 340/365 P, 365 R; 250/221, 229, 578; 178/17 R, 17 A, 17 C, 17 D; 179/90 K; 197/98

[56] References Cited

U.S. PATENT DOCUMENTS

| | | | |
|---|---|---|---|
| 3,579,047 | 5/1971 | Sturm et al. | 340/365 P |
| 3,609,713 | 9/1971 | Wooton et al. | 340/365 P |
| 3,612,240 | 10/1971 | Parker | 340/365 P |
| 3,617,627 | 11/1971 | McLean | 340/365 P |
| 3,767,022 | 10/1973 | Olson | 340/365 P |
| 3,818,485 | 6/1974 | Harrison | 340/365 P |

*Primary Examiner*—John W. Caldwell, Sr.
*Assistant Examiner*—James J. Groody
*Attorney, Agent, or Firm*—Ostrolenk, Faber, Gerb & Soffen

[57] ABSTRACT

A plurality of optical transmission tracts direct radiant energy from an appropriate light source to each of a plurality of photo-transistors or other light sensitive elements. The photo-transistors are adapted to generate an output signal whenever the radiant energy impinging thereon exceeds a threshold value which distinguishes environmental radiation from the radiant energy generated by the light source. A plurality of code bars, each representative of a different character code, are provided. Each code bar includes a hinged rail pivotally coupled to the housing and a plurality of radiant energy interrupting code projections depending therefrom. The number and location of the plurality of radiant energy interrupting code projections depending from each hinged rail is determined by the character code associated with the code bar of which they form a part. Each code bar is movable from a first position wherein its radiant energy interrupting code projections do not block the transmission of radiant energy from the light source to the photo-transistors, to a second position wherein the radiant energy interrupting code projections do block the transmission of radiant energy from the light source to selected photo-transistors. The movement of each code bar is controlled by a different, independently operable, push-button.

3 Claims, 1 Drawing Figure

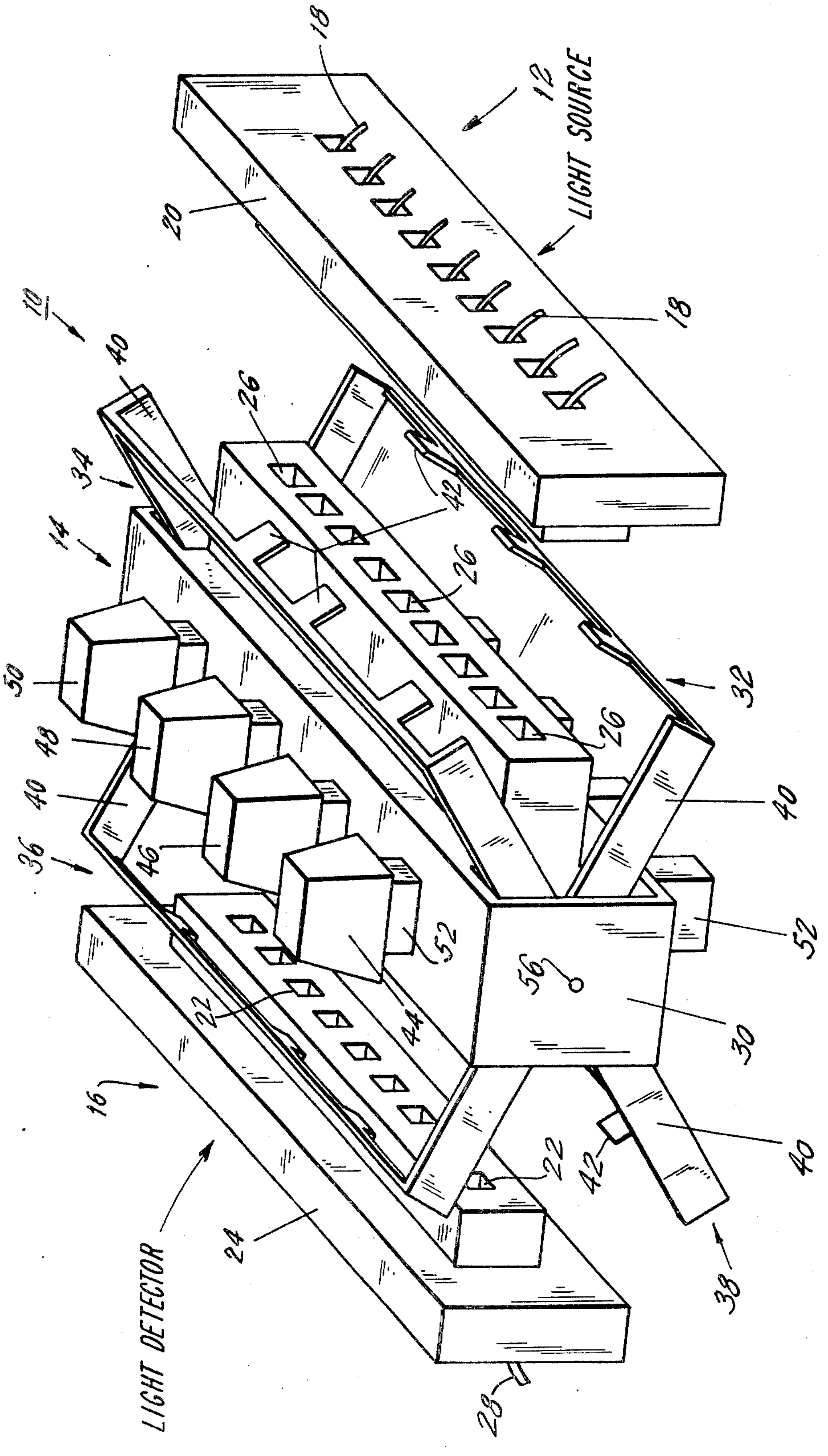
LIGHT SOURCE
LIGHT DETECTOR
10
12
14
16
18
20
22
24
26
28
30
32
34
36
38
40
42
44
46
48
50
52
56

OPTICAL KEYBOARD HAVING A PLURALITY OF PIVOTAL LIGHT OBSTRUCTING CODE BARS

BRIEF SUMMARY OF THE INVENTION

The present invention is directed towards a digital keyboard for generating binary coded signals. More particularly, the present invention concerns a digital keyboard utilizing selective optical transmissions to generate predetermined binary codes.

In a preferred embodiment, the keyboard includes a housing defining a plurality of optical transmission tracts which extend from a first to a second face of the housing. Opposite the first face of the housing, are a plurality of LEDs equal in number to the number of optical transmission tracts. Each LED is associated with a different transmission tract and is adapted to transmit radiant energy through its associated tract. Opposite the second face of the housing, are a plurality of photo-transistors equal in number to the number of optical transmission tracts. Each photo-transistor is associated with a different optical transmission tract and generates an output signal whenever the radiant energy incident therein exceeds a threshold value which distinguishes environmental radiation from the radiant energy generated by the LEDs.

The generation of various coded signals is made possible by a plurality of code bars which are pivotally connected to the housing. Each code bar represents a different character code and comprises a hinged rail including a plurality of radiant energy interrupting code projections depending therefrom. Each radiant energy interrupting code projection is adapted to block the transmission of radiant energy from a different LED through its associated optical transmission tract. The number and location of the radiant energy interrupting code projections with each hinged rail is determined by the character code associated with the code bar of which it forms a part.

In the preferred embodiment, each digital keyboard includes four code bars, two code bars being disclosed on either side of the housing. One code bar on either side of the housing is movable in a clockwise direction from a first position wherein the radiant energy interrupting code projections do not block the transmission of radiant energy from any of the LEDs to their associated photo-transistors to a second position wherein the radiant energy interrupting code projections do block the transmission of radiant energy from the LEDs to selected ones of the photo-transistors. The remaining code bars on either side of the housing are movable in a counter-clockwise direction from a first position wherein the radiant energy interrupting code projections do not block the transmission of radiant energy from any of the LEDs to their associated photo-transistors to a second position wherein the radiant energy interrupting code projections do block the transmission of radiant energy from the LEDs to selected ones of the photo-transistors.

BRIEF DESCRIPTION OF THE DRAWING

For the purpose of illustrating the invention, there is shown in the drawing an embodiment which is presently preferred, it being understood, however, that the invention is not limited to the precise arrangement and instrumentalities shown.

The drawing is a perspective view of a digital keyboard constructed in accordance with the principles of the present invention.

DETAILED DESCRIPTION OF THE PREFERRED EMBODIMENT

Referring now to the drawing wherein like numerals indicate like elements, there is shown a digital keyboard 10 constructed in accordance with the principles of the present invention. Keyboard 10 includes a light source 12 and encoding assembly 14, and a detector assembly 16. Light source 12 includes a plurality of LEDs or other appropriate light sources 18 which are supported in holding unit 20. LEDs 18 generate radiant energy which is to be detected by photo-sensitive elements (described below) in detector assembly 16. To this end, the radiant energy generated by light source 12 should be of a sufficiently high value to enable detector assembly 16 to distinguish radiant energy generated thereby from random environmental light.

Detector assembly 16 includes a plurality of light sensitive elements 22 supported by holding unit 24. Each light sensitive element 22 receives radiant energy passing through a different optical transmission tract 26 in housing 30 and generates an output signal on its output terminal 28 whenever the radiant energy incident thereon exceeds a predetermined threshold value. As used herein, the term "out-put signal" shall include any change in the output of light sensitive element 22 which indicates that the radiant energy incident thereon exceeds a predetermined threshold value. For example, the signal at the output terminal 28 of the light sensitive element 22 may be maintained at a binary "0" level as long as the radiant energy incident on the light sensitive element 22 remains below the threshold value while the output signal on output terminal 28 can be maintained at a binary "1" level whenever the radiation incident on light sensitive element 22 is above the threshold value.

As explained above, the threshold value of the radiant energy incident on the light sensitive element 22 should be sufficiently high to enable light sensitive elements 22 to distinguish between environmental light and radiant energy generated by light source 12. Among the light sensitive elements which may be employed, are photo-transistors, photo-diodes and photo-resistors.

Encoding assembly 14 includes a housing 30 defining a plurality of optical transmission tracts 26 which direct radiant energy generated by light source 12 to a different light sensitive element 22. In the embodiment illustrated in the drawing, each optical transmission tract 26 directs the light from an LED 18 adjacent a first end of the optical transmission tract to a light sensitive element 22 adjacent the second end of the optical transmission tract.

When keyboard 10 is in the condition illustrated in the drawing, light generated by light source 12 is directed by optical transmission tracts 26 to each light sensitive element 22 and an output signal appears on the output terminal 28 of each light sensitive element 22. With reference to the example utilized above, the output terminal 28 of each light sensitive element 22 will be at a binary "1" and the output of the digital keyboard (as defined by the output terminals 28 of each of the light sensitive elements 22) will be 111111111.

The generation of appropriate coded signals is controlled by code bars 32, 34, 36 and 38 which are pivotally coupled to housing 30. Each code bar 32–38 comprises a hinged rail 40 which is pivotally connected to housing 30 by an appropriate pin 56. Each code bar represents a different character code which is determined by the number and the location of radiant energy interrupting code projections 42 depending from rail 40. Whenever a code bar 32–38 is moved to a position wherein its radiant energy interrupting code projections 42 block the transmission of light from selected LEDs 18 to their corresponding light sensitive elements 22, a digital signal will be generated at the output of detector assembly 16 which is determined by the number and location of radiant energy interrupting code projections 42. By properly selecting the number and location of radiant energy interrupting code projections 42, it is possible to program code bars 32–38 to generate any desired digital output.

In the embodiment illustrated in the drawing, each code bar 32–38 is pivotal from a first position (the position illustrated in the drawing) wherein the radiant energy interrupting code projections 42 do not block the transmission of radiant energy generated by light source 12 and a second position (not shown) wherein the radiant energy interrupting code projections 42 prevent radiation transmitted by light source 12 from impinging on selected ones of said light sensitive elements 22. Preferably, two code bars are located on either side of housing 30, one pair of code bars (32,34) located one side of housing 30, the remaining two code bars (36,38) being disposed on the remaining side of housing 30. In the present embodiment, code bars 34,38 pivot in the clockwise direction (as viewed in the drawing) from the first position wherein they do not block transmission of radiant energy to the second position wherein they block transmission of radiant energy. Conversely, code bars 32 and 36 pivot in the counterclockwise direction from a position wherein they do not block the transmission of radiant energy to a position wherein they do block light transmission of radiant energy.

The movement of code bars 34–38 from their non-blocking to their blocking position is controlled by keys 44, 46, 48 and 50. Each key 44–50 controls the operation of a different code bar. Each key 44–50 is connected to a key plunger 52 which passes through housing 30 and, in cooperation with an appropriate coupling apparatus (not shown) within housing 30, causes its associated code bar to move from its non-blocking to its blocking position whenever the key is depressed.

The present invention may be embodied in other specific forms without departing from the spirit or essential attributes thereof and, accordingly, reference should be made to the appended claims rather than to the foregoing specification as indicating the scope of the invention.

What is claimed is:

1. Apparatus for generating digital coded signals comprising:

(A) detector means including a plurality of light sensitive areas, each said light sensitive area being adapted to generate an output signal whenever radiant energy incident thereon exceeds a threshold value;

(B) light source means for generating radiant energy of a value greater than said threshold value;

(C) a housing including a plurality of optical transmission tracks formed therein, each of said optical transmission tracks for directing radiant energy generated by said light source means to a different one of said light sensitive areas;

(D) first, second, third and fourth code bars pivotally coupled to said housing, each said code bar comprising first, second and third sections, said first section including a plurality of radiant energy interrupting code projections depending therefrom, the number and location of said projections being determined by the character code associated with the code bar from which they depend, said second and third sections extending from opposite ends of said first section and being pivotally connected to opposite sides of said housing;

(E) means for pivotally connecting said second and third sections of each of said code bars to opposite ends of said housing, said coupling means coupling said code bars in such a manner that:

(1) said first code bar is pivotable in a clockwise direction from a first position wherein its radiant energy interrupting code projections do not block the transmission of said radiant energy from said light source to said light sensitive areas to a second position wherein its radiant energy interrupting code projections are located between said optical transmission tracks and said light sensitive areas and block the transmission of said radiant energy from said light source means to at least some of said light sensitive areas;

(2) said second code bar is pivotable in a counterclockwise direction from a first position wherein its radiant energy interrupting code projections do not block transmission of said radiant energy from said light source to said light sensitive areas to a second position wherein its radiant energy interrupting code projections are located between at least some of said optical transmission tracks and said light sensitive areas and block the transmission of said radiant energy from said light source to at least some of said light sensitive areas;

(3) said third code bar is pivotable in a clockwise direction from a first position wherein its radiant energy interrupting code projections do not block transmission of said radiant energy from said light source to said light sensitivity areas to a second position wherein its radiant energy interrupting code projections are located between said light source and at least some of said optical transmission tracks and block the transmission of said radiant energy from said light source to at least some of said light sensitive areas; and (4) said fourth code bar is pivotable in a counterclockwise direction from a first position wherein its radiant energy interrupting code projections do not block transmission of said radiant energy from said light source to said sensitive areas to a second position wherein its radiant energy interrupting code projections are located between said light source means and at least some of said optical transmission tracks and block the transmission of said radiant energy from said light source to at least some of said light sensitive areas; and (F) four keys, each key associated with a different said code bar and movable between a first position wherein its associated code bar is in its first position and a second position wherein its associated code bar is in its second position.

2. Apparatus according to claim 1, wherein said light source means comprises a plurality of radiant energy sources equal in number to the number of said optical transmission tracts, each said radiant energy source being associated with a different said optical transmission tract.

3. Apparatus according to claim 1, wherein each of said light sensitive areas is a discrete light sensitive element which generates a binary "1" at its output whenever the radiant energy incident thereon exceeds said threshold value and which generates a binary "0" on its output whenever the radiant energy incident thereon is below said threshold value.

* * * * *